United States Patent
Ge

(10) Patent No.: US 7,119,907 B2
(45) Date of Patent: Oct. 10, 2006

(54) LOW COHERENT INTERFERENCE FRINGE ANALYSIS METHOD

(75) Inventor: Zongtao Ge, Saitama (JP)

(73) Assignee: Fujinon Corporation, Saitama (JP)

( * ) Notice: Subject to any disclaimer, the term of this patent is extended or adjusted under 35 U.S.C. 154(b) by 473 days.

(21) Appl. No.: 10/446,050

(22) Filed: May 28, 2003

(65) Prior Publication Data

US 2003/0234938 A1    Dec. 25, 2003

(30) Foreign Application Priority Data

Jun. 21, 2002    (JP)    ............................. 2002-182130

(51) Int. Cl.
   *G01B 9/02*    (2006.01)
(52) U.S. Cl. ..................................... 356/497; 356/511
(58) Field of Classification Search ................ 356/496, 356/497, 511–516
   See application file for complete search history.

(56) References Cited

U.S. PATENT DOCUMENTS

| | | | | |
|---|---|---|---|---|
| 5,398,113 A | * | 3/1995 | de Groot | 356/497 |
| 5,706,085 A | * | 1/1998 | Blossey et al. | 356/512 |
| 5,953,124 A | * | 9/1999 | Deck | 356/497 |
| 6,028,670 A | * | 2/2000 | Deck | 356/497 |
| 6,934,035 B1 | * | 8/2005 | Yang et al. | 356/485 |

\* cited by examiner

*Primary Examiner*—Hwa (Andrew) Lee
(74) *Attorney, Agent, or Firm*—Snider & Associates; Ronald R. Snider

(57)    ABSTRACT

In a low coherent interference fringe analysis method, a light intensity distribution of interference fringes formed by object light and reference light in a sample is represented by a light intensity distribution function using an envelope function. Subsequently, phase shifting is carried out, so as to measure the light intensity at each shift stage. According to thus measured light intensities at respective shift stages, unknowns of the light intensity distribution function are computed. Then, according to the computed unknowns, a peak position of a curve of the envelope function is determined. According to thus determined peak position, phase information of the sample is determined.

5 Claims, 3 Drawing Sheets

US 7,119,907 B2

LOW COHERENT INTERFERENCE FRINGE ANALYSIS METHOD

RELATED APPLICATIONS

This application claims the priority of Japanese Patent Application No. 2002-182130 filed on Jun. 21, 2002, which is incorporated herein by reference.

BACKGROUND OF THE INVENTION

1. Field of the Invention

The present invention relates to a low coherent interference fringe analysis method for measuring and analyzing phase information such as surface forms and internal refractive index distributions of a sample by using low coherent light (e.g., white light) including a plurality of light waves having respective wavelengths different from each other as illumination light in an interferometer apparatus.

2. Description of the Prior Art

While low coherent interference fringe analysis method using interference of low coherent light such as white light had conventionally been utilized for measuring surface forms of precision instruments such as lenses and IC boards, their field of application has recently been expanding, for example, so as to be employed in tomographic analyses of eyeballs.

A low coherent interference fringe analysis method comprising the steps of dividing low coherent light as illumination light in a Michelson type interferometer apparatus, for example, into two; irradiating a reference surface with one of thus obtained two light components so as to form reference light; irradiating a sample with the other so as to form object light carrying phase information of the sample; causing the object light and the reference light interfere with each other so as to form interference fringes; and capturing the interference fringes with a CCD camera or the like. When the light intensity of a predetermined pixel of the CCD camera is measured while shifting the sample or reference surface along the optical axis (which may be referred to as "z direction" in the following) of the interferometer apparatus, a light intensity distribution (interference waveform) along the z direction is obtained.

Since the low coherent light includes a plurality of light waves having respective wavelengths different from one another little by little, the interference fringes obtained by the low coherent light are considered to be composed of a plurality of sine functions having respective periods different from one another little by little. Therefore, in the light intensity distribution, the light intensity is maximized at a position where the phase of object light becomes identical to that of reference light at all the wavelengths (i.e., at a position where their optical path lengths are identical to each other) since their light waves enhance each other at all the wavelengths, whereas the light intensity gradually decays as farther distanced from the position.

It is important for the low coherent interference fringe analysis method to determine the position where the light intensity distribution is maximized. Actually obtained light intensity distribution data are discrete, whereas various methods for determining the maximum light intensity distribution position from the discrete data have been proposed.

Examples of known methods include those subjecting a number of discrete data items to Fourier transform or Hilbert transform, or integral transform such as wavelet transform, and those passing the squared AC component of the light intensity distribution to a low-pass filter.

However, such conventional methods require sample point intervals to be sufficiently small, which necessitates an enormous amount of arithmetic operations, thereby lowering the measurement speed.

SUMMARY OF THE INVENTION

In view of such circumstances, it is an object of the present invention to provide a low coherent interference fringe analysis method in which the amount of arithmetic operations for determining the maximum light intensity distribution point is small, so that phase information of a sample can be measured and analyzed at a high speed.

For achieving the above-mentioned object, the present invention provides a low coherent interference fringe analysis method dividing low coherent light as illumination light in an interferometer apparatus into two light components, using one of thus obtained two light components as reference light, irradiating a sample with the other so as to form object light carrying phase information of the sample, and analyzing the phase information of the sample according to information of interference fringes obtained by interference of the object light and the reference light with each other; the method comprising the steps of expressing a light intensity distribution of the interference fringes along an optical axis of the interferometer apparatus in terms of a predetermined light intensity distribution function including an unknown by using a predetermined envelope function; carrying out a phase shift with a predetermined shift width so as to measure the light intensity at each shift stage; computing the unknown of the light intensity distribution function according to the measured light intensity at each shift stage; determining a peak position of a curve of the envelope function according to the computed unknown; and attaining the phase information according to thus determined peak position.

The above-mentioned "envelope function" refers to two-dimensional functions expressed by envelope curves, and three-dimensional functions expressed by envelopes. In the case where the envelope function is a three-dimensional function expressed by an envelope, the above-mentioned "peak position of a curve of the envelope function" refers to a peak position of the envelope.

The envelope function may be a Gaussian distribution function, a sine function, or a quadratic function.

Preferably, the predetermined shift width is k/2 times an equivalent wavelength of the low coherent light, where k is an integer.

DESCRIPTION OF THE PREFERRED EMBODIMENTS

In the following, embodiments of the present invention will be explained with reference to the drawings.

Interferometer Apparatus

First, with reference to FIG. 4, the overall configuration of an interferometer apparatus for carrying out the low coherent interference fringe analysis method in accordance with the present invention will be explained.

Figure 4:
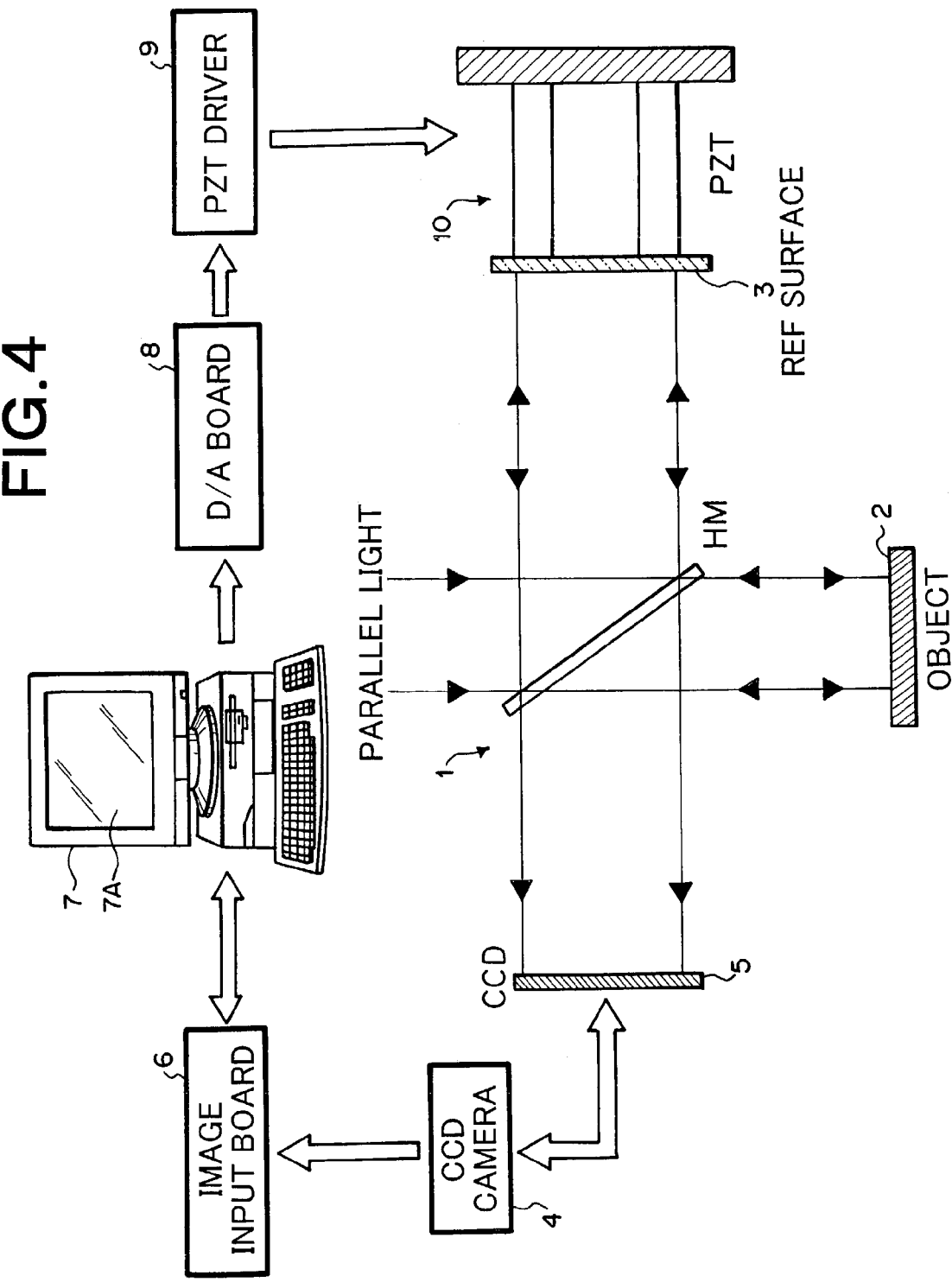
FIG. 4 is a schematic diagram showing an example of interferometer apparatus for carrying out the method in accordance with the present invention.

The interferometer apparatus 1 shown in FIG. 4 is a Michelson type interferometer apparatus which is configured so as to output low coherent light (e.g., white light from a halogen lamp or the like) as illumination light from a light source which is not depicted. Thus outputted low coherent light is divided into two by a half mirror. A reference surface 3 is irradiated with one of thus obtained two light components, so as to form reference light; whereas a sample (object to be observed) 2 is irradiated with the other, so as to form object light carrying surface form information of the sample 2. The object light and reference light are recombined together, and the resulting interference fringes are captured by the imaging surface of a CCD 5 of an image pickup camera 4. By way of an image input board 6, thus captured interference fringes are fed into a computer 7 equipped with a CPU and an image processing memory, whereby the inputted interference fringe image data are subjected to various arithmetic operations, and the results of operations are displayed on a monitor screen 7A. Here, the interference fringe image data outputted from the image pickup camera 4 are once stored into the memory by an operation of the CPU. By way of a D/A board 8, a piezoelectric driving signal outputted from the computer 7 is fed into a piezoelectric driver 9. In response to this signal, a PZT (piezoelectric device) actuator 10 is driven, so as to carry out a phase shift.

First Embodiment

Figure 1:
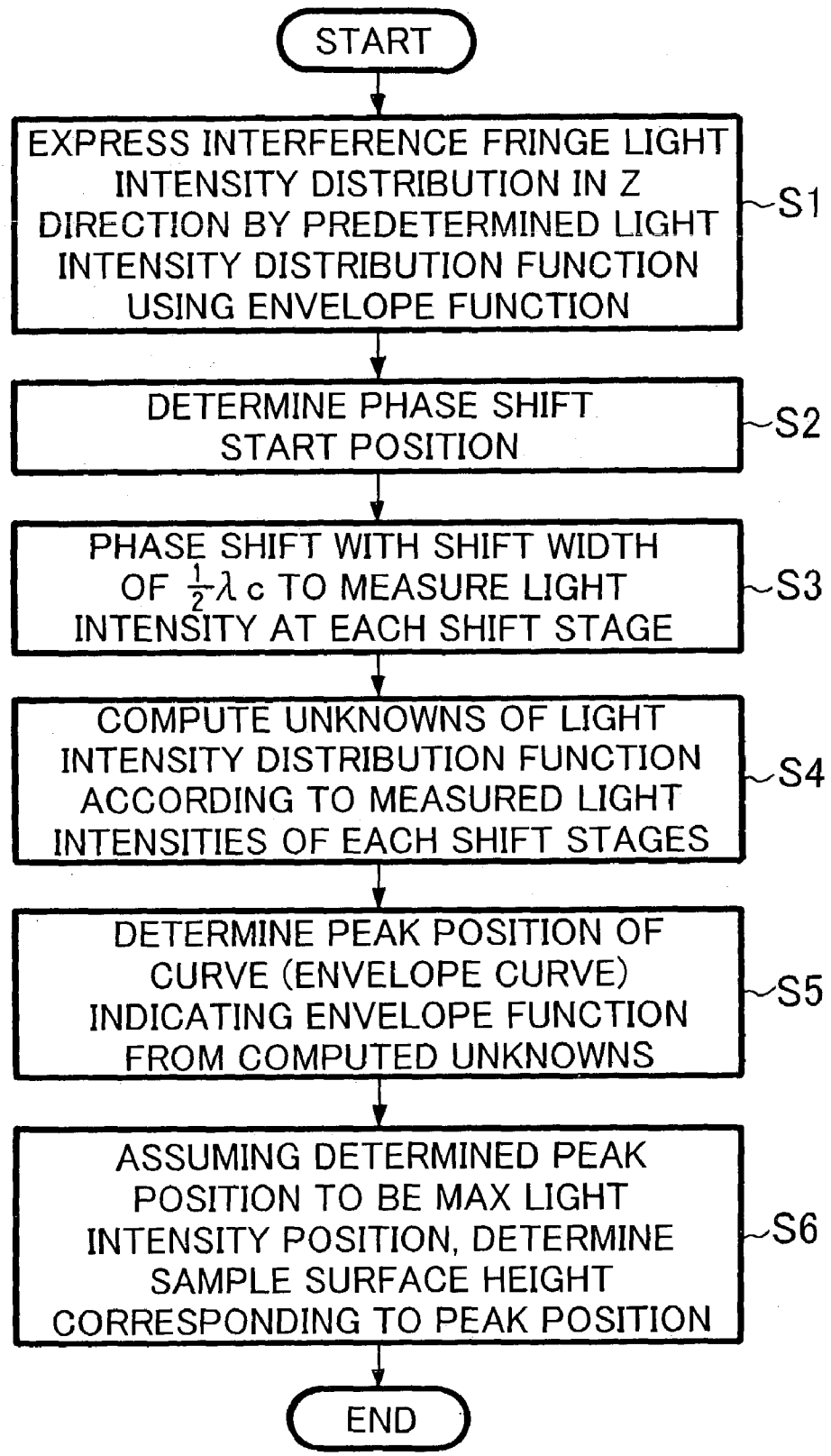
FIG. 1 is a flowchart showing a procedure of the method in accordance with a first embodiment of the present invention.
Figure 2:
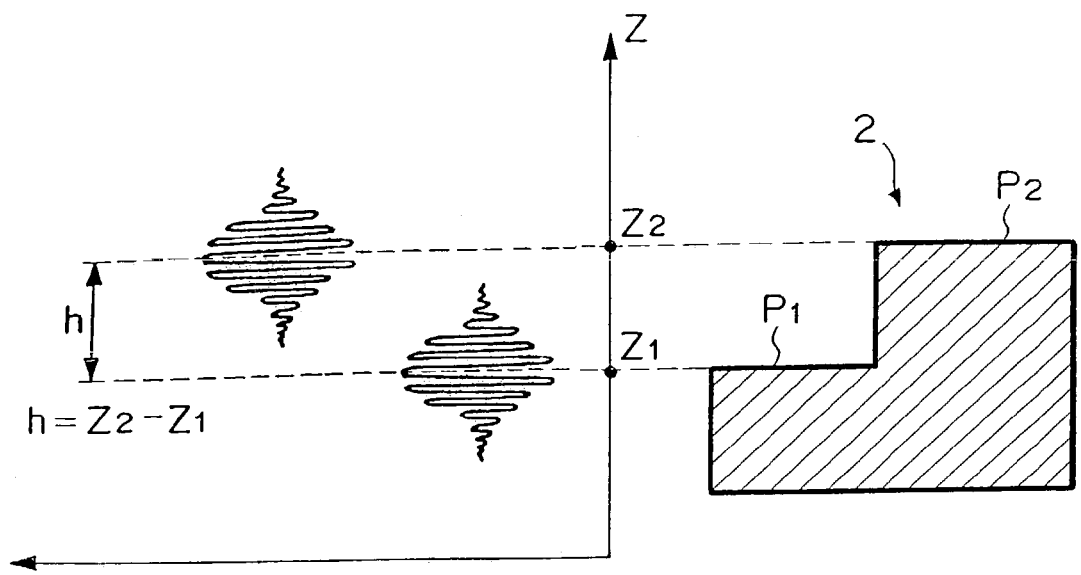
FIG. 2 is a schematic diagram showing the principle of the method shown in FIG. 1.
Figure 3:
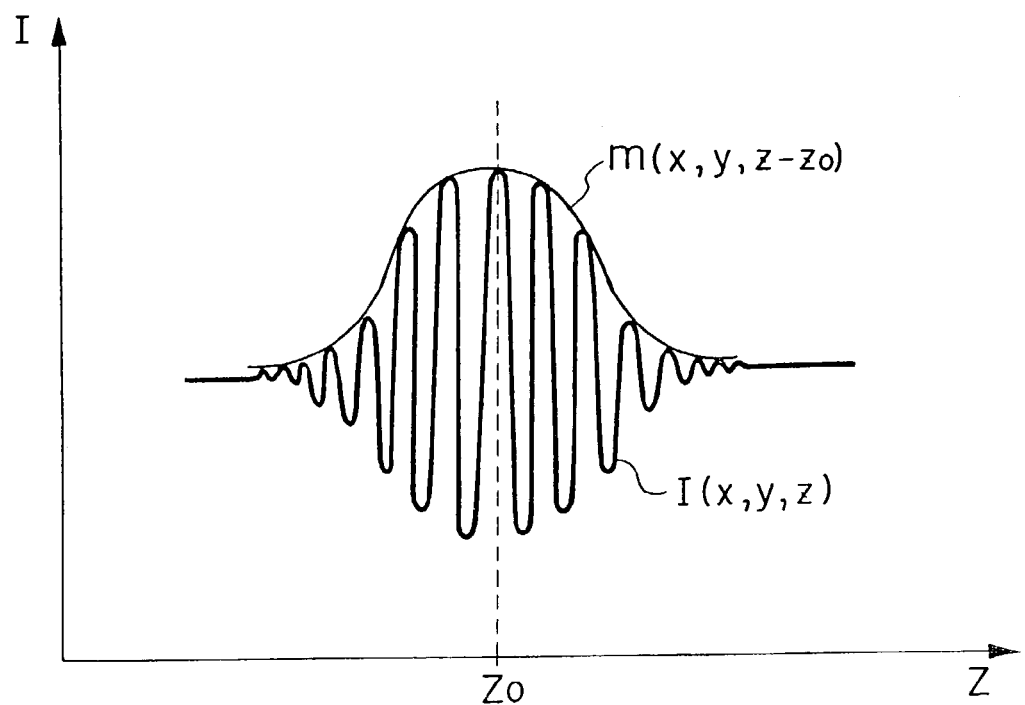
FIG. 3 is a chart showing an envelope function.

The low coherent interference fringe analysis method in accordance with a first embodiment of the present invention using the above-mentioned interferometer apparatus 1 will now be explained in detail with reference to FIGS. 1 to 3. FIG. 1 is a flowchart showing a procedure of the low coherent interference fringe analysis method in accordance with the first embodiment of the present invention, FIG. 2 is a schematic diagram showing its principle, and FIG. 3 is a schematic chart showing an envelope function. Explained in the following is a case where the method of the present invention is employed for measuring the gap between two smooth planes $P_1$, $P_2$ formed in a surface of the sample 2 at respective heights different from each other as shown in FIG. 2.

First, the principle of low coherent interference as a premise will be explained with reference to FIG. 2. The low coherent light from the light source of the interferometer apparatus 1 is divided into two, the reference surface 3 is irradiated with one of thus obtained two light components, so as to form reference light, whereas the sample 2 is irradiated with the other and then light reflected therefrom is used as object light. The object light and the reference light are caused to interfere with each other, whereby interference fringes are obtained. While capturing thus obtained interference fringes with the image pickup camera 4, the reference surface 3 is moved along the optical axis of the interferometer apparatus 1 (in the z direction), and the light intensity of a predetermined pixel (corresponding to each of respective points within the planes $P_1$, $P_2$) in the CCD 5 is measured, whereby a light intensity distribution (interference waveform) along the z direction is obtained as shown in FIG. 2.

In this light intensity distribution, the light intensity is maximized at a position where the phase of object light becomes identical to that of reference light at all the wavelengths (i.e., at a position where their optical path lengths are identical to each other) since their light waves enhance each other at all the wavelengths, whereas the light intensity gradually decays as farther distanced from the position. Therefore, the gap h between the planes $P_1$, $P_2$ in the sample 2 can be computed if a position $z_1$ yielding the maximum light intensity corresponding to the height of the plane $P_1$ and a position $z_2$ yielding the maximum light intensity corresponding to the height of the plane $P_2$ can be determined.

In the method of this embodiment, as shown in FIG. 1, the light intensity distribution of the interference fringes in the z direction corresponding to one point within the plane $P_1$ of the sample 2 is initially expressed in terms of a predetermined light intensity distribution function by using an envelope function (S1). This light intensity distribution function is represented by the following equation (1):

$$I(x, y, z) = I_0 \left\{ 1 + m(x, y, z-z_0)\cos\left[\frac{2\pi(z-z_0)}{\lambda_c} + \varphi(x, y, z_0)\right] \right\} \quad (1)$$

where $I(x,y,z)$ is the light intensity distribution function of interference fringes; $I_0$ is the sum of the intensities of reference light and object light; $m(x, y, z-z_0)$ is the envelope function; $\lambda_c$ is the equivalent wavelength of low coherent light; $\phi(x, y, z_0)$ is the phase difference; x, y, and z are coordinate positions, and $z_0$ is the maximum light intensity position. Here, x and y directions (two axial directions orthogonal to the optical axis of the interferometer apparatus 1) are fixed to a predetermined point on a pixel, whereby the light intensity distribution function and envelope function can be regarded as functions of z and $z_0$.

Thus, the present invention presumes that an envelope function indicative of an envelope curve of a curve representing the above-mentioned light intensity distribution (which is assumed to be continuous here for simplification although actually obtained light intensity distribution data are discrete) exists as shown in FIG. 3. If such an envelope function exists, the light intensity distribution can be represented as the above-mentioned equation (1) by using this envelope function.

In the method of this embodiment, the above-mentioned envelope function is expressed by the Gaussian distribution function represented by the following equation (2):

$$m(x, y, z-z_0) = \frac{2\sqrt{I_{obj}I_{ref}}}{I_0} e^{-4\pi^2 \frac{(z-z_0)^2}{L_c^2}} \quad (2)$$

where $I_{obj}$ is the intensity of object light, $I_{ref}$ is the intensity of reference light, and $L_c$ is the coherent length coefficient.

Using unknowns A, B, C, θ, and $z_0$, the above-mentioned equation (1) can be simplified as the following equation (3):

$$I(x, y, z) = A + Be^{-C^2(z-z_0)^2}\cos\left(\frac{2\pi z}{\lambda_c} + \theta\right) \quad (3)$$

Subsequently, a phase shift start point is determined (S2). The start position is determined as follows, for example. First, while capturing the interference fringes with the image pickup camera 4, the reference surface 3 is moved along the optical axis of the interferometer apparatus 1 (in the z direction), and the light intensity of a predetermined pixel (corresponding to each of respective points within the planes $P_1$, $P_2$) is temporarily measured. The interference fringes are considered to exist where the light intensity exceeds a level which is the sum of a white level (normal light intensity level of light source light) and a predetermined value for excluding the noise influence. In the area where the interference fringes are considered to exist, the measured interference fringe intensity is subtracted from the average value of white level. The position where the resulting value is maximized is defined as a temporary maximum light intensity distribution position, and the phase shift start position is taken at a position in the vicinity thereof.

After the start point is determined, a phase shift method (step method) in sub-fringe interference measurement is utilized, so as to carry out 5-step phase shifting with a shift width (step width) which is k/2 times the equivalent wavelength, where k is an integer, and the light intensity is measured at each shift stage (S3). The first step is performed at the start position. Here, according to the individual shift stages, the z value of the above-mentioned equation (3) is represented by the following equation (4):

$$z = 0 \cdot \lambda_c, \frac{1}{2} \cdot \lambda_c, \frac{2}{2} \cdot \lambda_c, \frac{3}{2} \cdot \lambda_c, \frac{4}{2} \cdot \lambda_c \qquad (4)$$

Subsequently, thus measured respective light intensities of the shift stages and the individual values of the above-mentioned equation (4) are inputted to the above-mentioned equation (3), so as to form the following simultaneous equations (5-1) to (5-5) and compute the unknowns in the above-mentioned equation (3) (S4):

$$\begin{cases} Be^{-C^2(0-z_0)^2}\cos\theta = -A + m_1 & (5\text{-}1) \\ Be^{-C^2\left(\frac{\lambda_c}{2}-z_0\right)^2}\cos\theta = A - m_2 & (5\text{-}2) \\ Be^{-C^2\left(\frac{2\lambda_c}{2}-z_0\right)^2}\cos\theta = -A + m_3 & (5\text{-}3) \\ Be^{-C^2\left(\frac{3\lambda_c}{2}-z_0\right)^2}\cos\theta = A - m_4 & (5\text{-}4) \\ Be^{-C^2\left(\frac{4\lambda_c}{2}-z_0\right)^2}\cos\theta = -A + m_5 & (5\text{-}5) \end{cases}$$

where $m_1$ to $m_5$ are the light intensities (modulations) measured at the respective shift stages.

The above-mentioned simultaneous equations (5-1) to (5-5) can be solved by the following procedure. First, using the above-mentioned equations (5-1) to (5-5) two by two, the following equations (6-1) to (6-4) are determined.

$$\begin{cases} e^{-C^2\left(\frac{7\lambda_c^2}{4}-\lambda_c z_0\right)} = \frac{-A+m_5}{A-m_4} & (6\text{-}1) \\ e^{-C^2\left(\frac{5\lambda_c^2}{4}-\lambda_c z_0\right)} = \frac{A+m_4}{-A+m_3} & (6\text{-}2) \\ e^{-C^2\left(\frac{3\lambda_c^2}{4}-\lambda_c z_0\right)} = \frac{-A+m_3}{A-m_2} & (6\text{-}3) \\ e^{-C^2\left(\frac{\lambda_c^2}{4}-\lambda_c z_0\right)} = \frac{A-m_2}{-A+m_1} & (6\text{-}4) \end{cases}$$

From the relationship among these equations (6-1) to (6-4), the following equation (7) is obtained:

$$e^{-\frac{2\lambda_c^2 C^2}{4}} = \frac{\frac{-A+m_5}{A-m_4}}{\frac{A-m_4}{-A+m_3}} = \frac{\frac{A-m_4}{-A+m_3}}{\frac{-A+m_3}{A-m_2}} = \frac{\frac{-A+m_3}{A-m_2}}{\frac{A-m_2}{-A+m_1}} \qquad (7)$$

The above-mentioned equation (7) is modified into the following equations (8-1) and (8-2):

$$\begin{cases} (-A+m_5)(-A+m_3)^3 = (A-m_2)(A-m_4)^3 & (8\text{-}1) \\ (A-m_4)(A-m_2)^3 = (-A+m_1)(-A+m_3)^3 & (8\text{-}2) \end{cases}$$

When the above-mentioned equations (8-1) and (8-2) are simplified and organized in terms of unknown A, the following equations (9-1) and (9-2) are obtained:

$$\begin{cases} (3m_3+m_5-3m_4-m_2)A^3 + (3m_4^2+3m_4m_2-3m_3^2-3m_3m_5)A^2 + & (9\text{-}1) \\ \quad (-m_4^3-3m_4^2m_2+m_3^3+3m_3^2m_5)A + (m_3^3m_5-m_4^3m_2) = 0 \\ (3m_3+m_1-3m_2-m_4)A^3 + (3m_2^2+3m_4m_2-3m_3^2-3m_1m_3)A^2 + & (9\text{-}2) \\ \quad (m_3^3+3m_3^2m_1-m_2^3-3m_4^2m_2)A + (m_2^3m_4-m_3^3m_1) = 0 \end{cases}$$

Subsequently, the coefficients in the above-mentioned equation (9-1) are substituted by the following equations (10-1) to (10-4), or the coefficients in the above-mentioned equation (9-2) are substituted by the following equations (11-1) to (11-4), so as to simplify the equation:

$$\begin{cases} 3m_3+m_5-3m_4-m_2 = a & (10\text{-}1) \\ -3m_3^2-3m_5m_3+3m_4^2+3m_4m_2 = b & (10\text{-}2) \\ m_3^3+3m_3^2m_5-m_4^3-3m_4^2m_2 = c & (10\text{-}3) \\ m_4^3m_2-m_3^3m_5 = d & (10\text{-}4) \end{cases}$$

$$\begin{cases} 3m_3+m_1-3m_2-m_4 = a & (11\text{-}1) \\ 3m_2^2+3m_4m_2-3m_3^2-3m_1m_3 = b & (11\text{-}2) \\ m_3^3+3m_3^2m_1-m_2^3-3m_4^2m_2 = c & (11\text{-}3) \\ m_2^3m_4-m_3^3m_1 = d & (11\text{-}4) \end{cases}$$

Thus simplified equation becomes a common cubic equation as represented by the following equation (12):

$$aA^3+bA^2+cA+d=0 \qquad (12)$$

and this equation (12) will now be solved.

First, unknown A is substituted by the following equation (13), so that the above-mentioned equation (12) is represented by the cubic equation of y represented by the following equation (14):

$$A = y - \frac{b}{3a} \qquad (13)$$

-continued $$y^3 + \left(\frac{c}{a} - \frac{b^2}{3a^2}\right)y + \left(\frac{2b^3}{27a^3} - \frac{bc}{3a^2} + \frac{d}{a}\right) = 0 \quad (14)$$

Further, the coefficients of the above-mentioned equation (14) are substituted by the following set of equations (15), so as to yield the following equation (16):

$$\begin{cases} p = \frac{c}{a} - \frac{b^2}{3a^2} & (15\text{-}1) \\ q = \frac{2b^3}{27a^3} - \frac{bc}{3a^2} + \frac{d}{a} & (15\text{-}2) \end{cases}$$

$$y^3 + py + q = 0 \quad (16)$$

When equation (16) is solved in terms of y, the result is represented by the following equation (17):

$$y = \sqrt[3]{-\frac{q}{2} + \sqrt{\left(\frac{q}{2}\right)^2 + \left(\frac{p}{3}\right)^3}} + \sqrt[3]{-\frac{q}{2} - \sqrt{\left(\frac{q}{2}\right)^2 + \left(\frac{p}{3}\right)^3}} \quad (17)$$

When this result is inputted to the above-mentioned equation (13), unknown A is determined. When thus determined value of A is inputted to the above-mentioned expression (7), unknown C can be represented by the following equation (18):

$$C = \sqrt{-\frac{4}{2\lambda_c}\log\frac{(A - m_5)(A - m_3)}{(A - m_4)^2}} \quad (18)$$

When the above-mentioned equations (6-1) to (6-4) are solved in terms of $z_0$ while inputting the above-mentioned equation (18) thereto, the following equations (19-1) to (19-4) are obtained:

$$\begin{cases} z_{01} = \frac{1}{\lambda_c C^2}\log\frac{-A + m_5}{A - m_4} + \frac{7\lambda_c}{4} & (19\text{-}1) \\ z_{02} = \frac{1}{\lambda_c C^2}\log\frac{A - m_4}{-A + m_3} + \frac{5\lambda_c}{4} & (19\text{-}2) \\ z_{03} = \frac{1}{\lambda_c C^2}\log\frac{-A + m_3}{A - m_2} + \frac{3\lambda_c}{4} & (19\text{-}3) \\ z_{04} = \frac{1}{\lambda_c C^2}\log\frac{A - m_2}{-A + m_1} + \frac{\lambda_c}{4} & (19\text{-}4) \end{cases}$$

Here, $z_{01}$ to $z_{04}$ represent respective values of $z_0$ in the individual equations.

Thus determined $z_{01}$ to $z_{04}$ are averaged by the following equation (20), so as to determine the peak position $z_0$ of a curve (envelope curve) representing the above-mentioned envelope function (S5):

$$z_0 = \frac{z_{01} + z_{02} + z_{03} + z_{04}}{4} \quad (20)$$

Assuming thus determined peak position to be the maximum light intensity distribution position, the height (phase) of the plane $P_1$ in the sample 2 is determined.

After the height of the plane $P_1$ in the sample 2 is determined as in the foregoing, a procedure similar to that mentioned above is repeated, so as to determine the height of the plane $P_2$ in the sample 2. According to their difference, the gap between the planes $P_1$, $P_2$ is computed.

The phase shift steps may be set to 5 steps as in the following equation (21), or to any step width such as ¼ of the equivalent wavelength as represented by the following equation (22):

$$z = 0 \cdot \lambda_c, \frac{3}{2} \cdot \lambda_c, \frac{4}{2} \cdot \lambda_c, \frac{5}{2} \cdot \lambda_c, \frac{6}{2} \cdot \lambda_c \quad (21)$$

$$z = \frac{k}{4} \cdot \lambda_c \quad (22)$$

However, the amount of arithmetic operations is minimized when the step width is ½ of the equivalent wavelength. The unknowns can also be determined by 4 steps instead of 5 steps, since $B\cos\theta$ can also be regarded as an unknown.

Second Embodiment

The method in accordance with a second embodiment of the present invention will now be explained. This method differs from that of the first embodiment in that the envelope function explained in the first embodiment is changed from the Gaussian distribution function to a quadratic function. Namely, in this embodiment, the light intensity distribution function is represented by the following equation (23):

$$I(x, y, z) = A + [B + C(z - z_0)^2]\cos\left(\frac{2\pi z}{\lambda_c} + \theta\right) \quad (23)$$

by using unknowns A, B, C, $\theta$, and $z_0$.

Here, $C(z-z_0)^2$ is the envelope function.

After the phase shift start position is determined, as in the first embodiment, 5-step phase shifting is carried out with a shift width which is k/2 times the equivalent wavelength, where k is an integer, and the light intensity is measured at each shift stage. Here, the z value of the above-mentioned equation (23) is represented by the following equation (24):

$$z = 0 \cdot \lambda_c, \frac{1}{2} \cdot \lambda_c, \frac{2}{2} \cdot \lambda_c, \frac{3}{2} \cdot \lambda_c, \frac{4}{2} \cdot \lambda_c \quad (24)$$

Subsequently, thus measured respective light intensities of the shift stages and the individual values of the above-mentioned equation (24) are inputted to the above-mentioned equation (23), so as to form the following simultaneous equations (25-1) to (25-5) and compute the unknowns in the above-mentioned equation (23):

$$\begin{cases} m_1 = A + [B + C(0-z_0)^2]\cos\theta & (25\text{-}1) \\ m_2 = A - \left[B + C\left(\frac{\lambda_c}{2}-z_0\right)^2\right]\cos\theta & (25\text{-}2) \\ m_3 = A + [B + C(\lambda_c-z_0)^2]\cos\theta & (25\text{-}3) \\ m_4 = A - \left[B + C\left(\frac{3\lambda_c}{2}-z_0\right)^2\right]\cos\theta & (25\text{-}4) \\ m_5 = A + [B + C(2\lambda_c-z_0)^2]\cos\theta & (25\text{-}5) \end{cases}$$

According to thus computed unknowns, a peak position $z_0$ of the curve (envelope curve) representing the above-mentioned envelope function is determined as in the following equation (26):

$$z_0 = \frac{3(m_4-m_2) - 2(m_5-m_3)}{2(m_4-m_2) - 2(m_5-m_3)} \quad (26)$$

The remaining part of the procedure is the same as that in the first embodiment and thus will not be explained.

Third Embodiment

The method in accordance with a third embodiment of the present invention will now be explained. This method differs from that of the first embodiment in that the envelope function is changed to a cosine function (sine function). Namely, in this embodiment, the light intensity distribution function is represented by the following equation (27):

$$I(x, y, z) = A + B\cos(C(z-z_0)^2)\cos\left(\frac{2\pi z}{\lambda_c} + \theta\right) \quad (27)$$

by using unknowns A, B, C, $\theta$, and $z_0$.

Here, $B\cos(C(z-z_0)^2)$ is the envelope function.

After the phase shift start position is determined, as in the first embodiment, 5-step phase shifting is carried out with a shift width which is k/2 times the equivalent wavelength, where k is an integer, and the light intensity is measured at each shift stage. Here, the z value of the above-mentioned equation (27) is represented by the following equation (28):

$$z = 0\cdot\lambda_c, \frac{1}{2}\cdot\lambda_c, \frac{2}{2}\cdot\lambda_c, \frac{3}{2}\cdot\lambda_c, \frac{4}{2}\cdot\lambda_c \quad (28)$$

Subsequently, thus measured respective light intensities of the shift stages and the individual values of the above-mentioned equation (28) are inputted to the above-mentioned equation (27), so as to form the following simultaneous equations (29-1) to (29-5) and compute the unknowns in the above-mentioned equation (27):

$$\begin{cases} m_1 = A + B\cos(C(0-z_0)^2)\cos\theta & (29\text{-}1) \\ m_2 = A - B\cos\left(C\left(\frac{\lambda_c}{2}-z_0\right)^2\right)\cos & (29\text{-}2) \\ m_3 = A + B\cos(C(\lambda_c-z_0)^2)\cos\theta & (29\text{-}3) \\ m_4 = A - B\cos\left(C\left(\frac{3\lambda_c}{2}-z_0\right)^2\right)\cos\theta & (29\text{-}4) \\ m_5 = A + B\cos(C(2\lambda_c-z_0)^2)\cos\theta & (29\text{-}5) \end{cases}$$

According to thus computed unknowns, a peak position $z_0$ of the curve (envelope curve) representing the above-mentioned envelope function is determined. The remaining part of the procedure is the same as that of the first embodiment and thus will not be explained.

In each of the above-mentioned embodiments, the maximum light intensity distribution position along the z direction of interference fringes caused by low coherent light can be determined by measuring the actual light intensity only 5 times. Arithmetic operations are required only for determining unknowns of a light intensity distribution function represented by using an envelope function, whereby the amount of arithmetic operations is very small. Therefore, low coherent interference fringes can be analyzed and measured at a high speed.

Though three embodiments of the present invention are explained in the foregoing, the present invention can be modified in various manners without being restricted thereto.

For example, though a Michelson type interferometer apparatus is used in each of the above-mentioned embodiments, the method of the present invention can be carried out by using various kinds of interferometer apparatus in which respective optical path lengths of object light and reference light are substantially identical to each other, thus allowing low coherent light components to interfere with each other. The method of the present invention is also applicable to cases where minute samples are analyzed and measured by using a microscopic interferometer apparatus (also known as "interferometric microscope").

Though the step height in the surface of the sample is measured in each of the above-mentioned embodiments, the method of the present invention is applicable to measurements and analyses of various phase information items concerning samples such as general form measurements of sample surfaces and refractive index distributions within transparent samples.

Without being restricted to the above-mentioned method in which the reference surface is shifted by using a PZT, the phase shifting method may be one physically moving the sample, one achieving the phase shift method by changing the optical path length with an AO or EO device, or one using a transmission type device inserted into the reference light path and/or observation light path so as to modify the refractive index or the like and change the optical path length by a predetermined amount.

In the low coherent interference fringe analysis method in accordance with the present invention, as explained in detail in the foregoing, a light intensity distribution of interference fringes is represented by a light intensity distribution function using an envelope function. Subsequently, phase shifting is carried out, so as to measure the light intensity at each shift stage. According to thus measured respective light intensities at the individual shift stages, unknowns of the light intensity distribution function are computed. Then, according to the computed unknowns, a peak position of a curve of the envelope function is determined. According to thus determined peak position, phase information of the sample is determined. Therefore, the present invention yields the following effects.

Namely, assuming that the maximum light intensity distribution position coincides with a peak position of an envelope function curve, the procedure for determining the actual maximum light intensity distribution position can be simplified to a procedure for determining the peak position of the envelope function curve. For determining the peak position of the envelope function curve, it is only necessary to obtain information required for determining unknowns in the light intensity distribution function. For determining the unknowns, only the measurement of light intensity for the unknowns and arithmetic operations for solving the equations for the unknowns are necessary, whereby the measuring procedure is simple, and the amount of arithmetic operations to be executed can be made smaller. Therefore, the low coherent interference fringes can be measured and analyzed at a high speed.

What is claimed is:

1. A low coherent interference fringe analysis method dividing low coherent light as illumination light in an interferometer apparatus into two light components, using one of thus obtained two light components as reference light, irradiating a sample with the other so as to form object light carrying phase information of said sample, and analyzing phase information of said sample according to information of interference fringes obtained by interference of said object light and said reference light with each other; said method comprising the steps of:

expressing a light intensity distribution of said interference fringes along an optical axis of said interferometer apparatus in terms of a predetermined light intensity distribution function including an unknown by using a predetermined envelope function;

carrying out a phase shift with a predetermined shift width so as to measure said light intensity at each shift stage;

computing said unknown of said light intensity distribution function according to said measured light intensity at each shift stage;

determining a peak position of a curve of said envelope function according to said computed unknown; and attaining said phase information according to thus determined peak position.

2. A low coherent interference fringe analysis method according to claim 1, wherein said envelope function is a Gaussian distribution function.

3. A low coherent interference fringe analysis method according to claim 1, wherein said envelope function is a sine function.

4. A low coherent interference fringe analysis method according to claim 1, wherein said envelope function is a quadratic function.

5. A low coherent interference fringe analysis method according to claim 1, wherein said predetermined shift width is k/2 times an equivalent wavelength of said low coherent light, where k is an integer.

* * * * *